(12) United States Patent
Steck et al.

(10) Patent No.: US 11,683,879 B2
(45) Date of Patent: Jun. 20, 2023

(54) SCANNING X-RAY SYSTEM

(71) Applicant: Moxtek, Inc., Orem, UT (US)

(72) Inventors: Rick Steck, West Jordan, UT (US);
Scott Hardy, Riverton, UT (US);
Vincent F. Jones, Cedar Hills, UT (US)

(73) Assignee: Moxtek, Inc., Orem, UT (US)

( * ) Notice: Subject to any disclaimer, the term of this patent is extended or adjusted under 35 U.S.C. 154(b) by 245 days.

(21) Appl. No.: 17/316,838

(22) Filed: May 11, 2021

(65) Prior Publication Data

US 2021/0385931 A1 Dec. 9, 2021

Related U.S. Application Data

(60) Provisional application No. 63/036,484, filed on Jun. 9, 2020.

(51) Int. Cl.
*H05G 1/32* (2006.01)
*H05G 1/20* (2006.01)
(Continued)

(52) U.S. Cl.
CPC ............ *H05G 1/32* (2013.01); *H05G 1/10* (2013.01); *H05G 1/20* (2013.01); *H05G 1/30* (2013.01); *H05G 1/52* (2013.01); *G01N 23/04* (2013.01)

(58) Field of Classification Search
CPC .. H05G 1/02; H05G 1/32; H05G 1/52; H05G 1/14; H05G 1/30; H05G 1/10; H05G 1/12; H05G 1/20; H05G 1/58; H05G 1/38; H05G 1/06; H05G 1/54; H05G 1/265; H05G 1/025; H05G 1/60; H05G 1/44; H05G 1/36; H01J 35/18; H01J 35/04; H01J 35/06; H01J 35/101; H01J 35/045; H01J 2235/068; H01J 35/08; H01J 35/116; H01J 35/16; H01J 35/186; H01J 35/02; H01J 35/025; H01J 35/064; H01J 35/112; H01J 2235/12; H01J 2235/02; H01J 35/14; H01J 2235/166; H01J 5/18; H01J 2235/18; H01J 2235/183; H01J 35/13; H01J 2235/16; H01J 2235/1204; H01J 2235/1295; H01J 2235/086;
(Continued)

(56) References Cited

U.S. PATENT DOCUMENTS 3,780,291 A * 12/1973 Stein .................... G03B 42/028
378/146
RE28,544 E * 9/1975 Stein .................... G03B 42/028
378/146
(Continued)

FOREIGN PATENT DOCUMENTS

WO WO 2003/105159 12/2003

*Primary Examiner* — Irakli Kiknadze
(74) *Attorney, Agent, or Firm* — Thorpe North & Western, LLP

(57) ABSTRACT

A raster scanning x-ray source can be light and small, and can have high resolution. A raster-assembly can be attached directly to and can encircle an x-ray tube. The raster-assembly can adjoin or can be very close to the x-ray tube, resulting in a small and lightweight scanning x-ray source. X-rays can backscatter back into the x-ray tube instead of into a detector, thus improving resolution of the resulting image. A voltage-multiplier, which can be used with the x-ray source, can include separate voltage-multiplier-stages in a stack.

20 Claims, 9 Drawing Sheets

(51) Int. Cl.
*H05G 1/52* (2006.01)
*H05G 1/30* (2006.01)
*H05G 1/10* (2006.01)
*G01N 23/04* (2018.01)

(58) Field of Classification Search
CPC .............. H01J 35/065; H01J 2235/062; H01J 2201/30469; G21K 1/043; G21K 1/02; G21K 1/025; G21K 1/04; G01N 23/04; G01V 5/0041; G01V 5/12; G01V 5/10; A61B 6/4488; A61B 6/40; A61B 6/06; A61B 6/4233; A61B 6/542; A61B 6/544; A61B 6/482; A61B 6/405; A61B 6/4291; G05F 1/46; H02M 7/103; G01T 1/00; G01T 1/16; C09J 167/00; C09J 161/00; A61N 2005/1095; B82Y 10/00; Y10S 977/95
USPC .......................................... 378/147–160, 111
See application file for complete search history.

(56) References Cited

U.S. PATENT DOCUMENTS

| | | |
|---|---|---|
| 4,953,192 A | 8/1990 | Plewes |
| 6,418,194 B1 | 7/2002 | McPherson et al. |
| 6,434,219 B1 | 8/2002 | Rothschild et al. |
| 8,861,684 B2 | 10/2014 | Al-Kofahi et al. |
| 9,502,206 B2 | 11/2016 | Harker et al. |
| 10,436,724 B2* | 10/2019 | Grimshaw ............ G01V 5/0025 |
| 2004/0256565 A1* | 12/2004 | Adams ................. G01V 5/0066 250/358.1 |
| 2007/0172031 A1* | 7/2007 | Cason ...................... G21K 1/04 378/146 |
| 2009/0010393 A1* | 1/2009 | Klinkowstein .......... H05G 1/06 378/140 |
| 2009/0103686 A1* | 4/2009 | Rothschild ............. G21K 1/043 378/160 |
| 2017/0032923 A1* | 2/2017 | Tsunoda ................... H01J 35/18 |
| 2017/0251545 A1* | 8/2017 | Klinkowstein .......... H05G 1/10 |
| 2018/0239052 A1* | 8/2018 | Teague ..................... H05G 1/54 |
| 2019/0043633 A2 | 2/2019 | Rothschild |

* cited by examiner

SCANNING X-RAY SYSTEM

CLAIM OF PRIORITY

This application claims priority to U.S. Provisional Patent Application No. 63/036,484, filed on Jun. 9, 2020, which is incorporated herein by reference.

FIELD OF THE INVENTION

The present application describes high voltage power supplies and x-ray sources.

BACKGROUND

High voltage power supplies can provide a large voltage, such as for example tens of kilovolts. X-ray sources use high voltage power supplies.

A large voltage between a cathode and an anode of the x-ray tube, and sometimes a heated filament, can cause electrons to emit from the cathode to the anode. The anode can include a target material. The target material can generate x-rays in response to impinging electrons from the cathode.

BRIEF DESCRIPTION OF THE DRAWINGS (DRAWINGS MIGHT NOT BE DRAWN TO SCALE)

Figure 1:
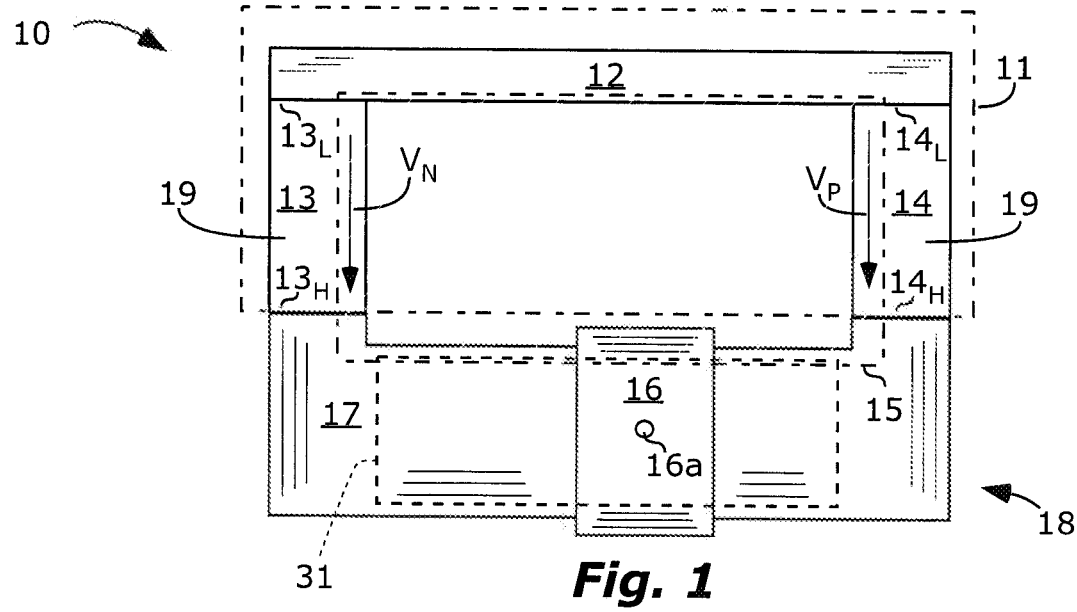

FIG. 1 is a perspective top view of a scanning x-ray source 10 with a raster-assembly 18 and a power-supply 11. The raster-assembly 18 includes a raster-wheel 16 and a collimator 17. The raster-assembly 18 is attached to and encircles an x-ray tube 31. The x-ray tube 31 is inside the collimator 17. The power-supply 11 is electrically-coupled to the x-ray tube 31.

Figure 2:
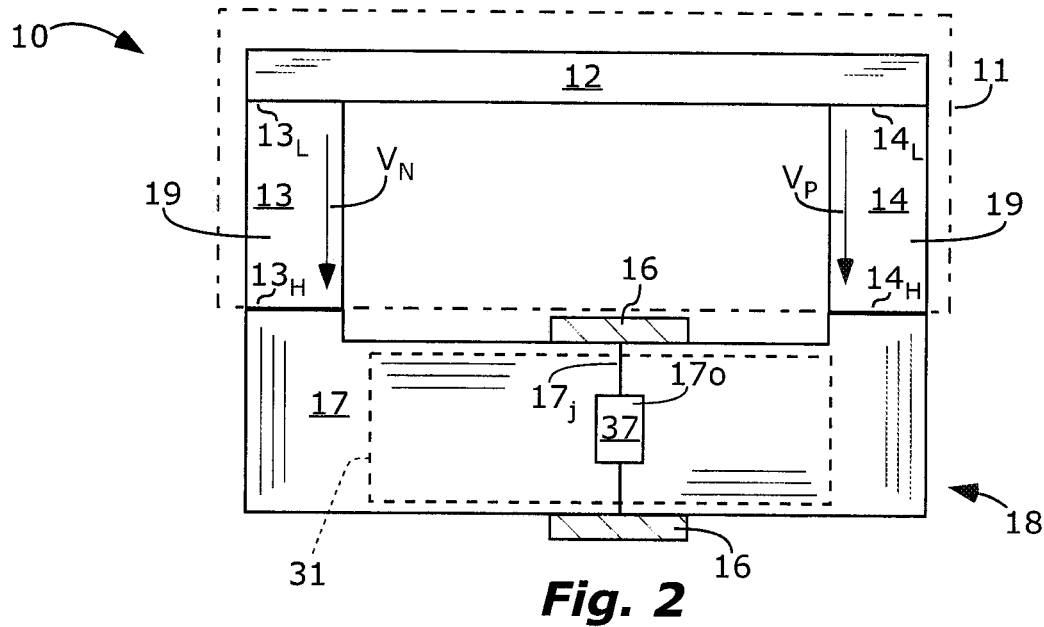

FIG. 2 is a perspective top view of the scanning x-ray source 10 with the raster-wheel 16 in cross-sectional view to illustrate the collimator 17 inside the raster-wheel 16. FIG. 2 also shows an x-ray window 37 of the x-ray tube 31, as seen through an opening 17o in the collimator 17.

Figure 3:
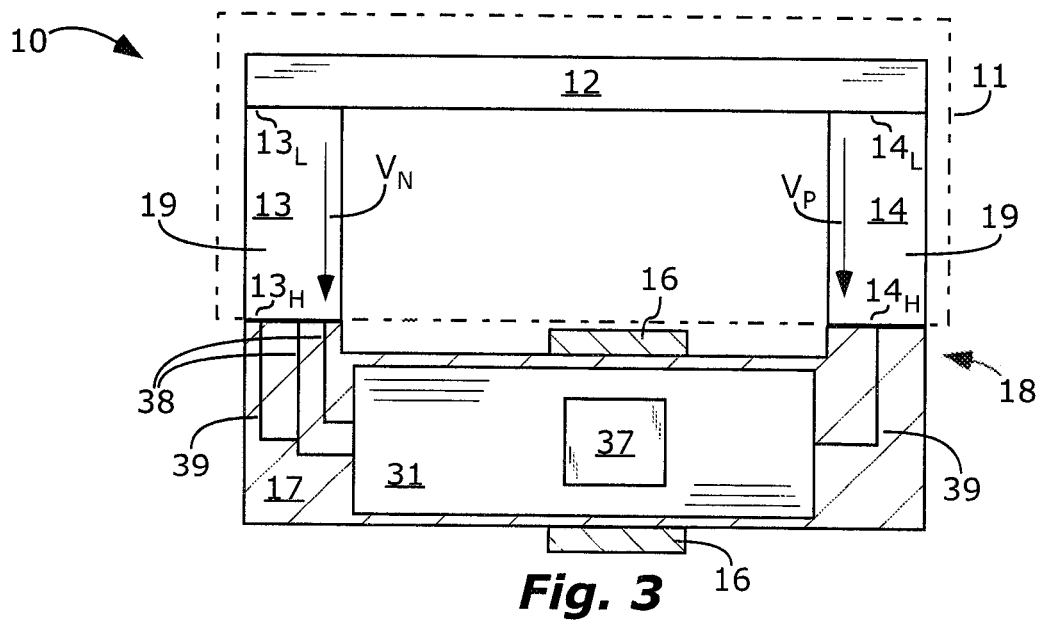

FIG. 3 is a perspective top view of the scanning x-ray source 10 with the raster-wheel 16 and the collimator 17 in cross-sectional view to illustrate the x-ray tube 31 inside.

Figure 4:
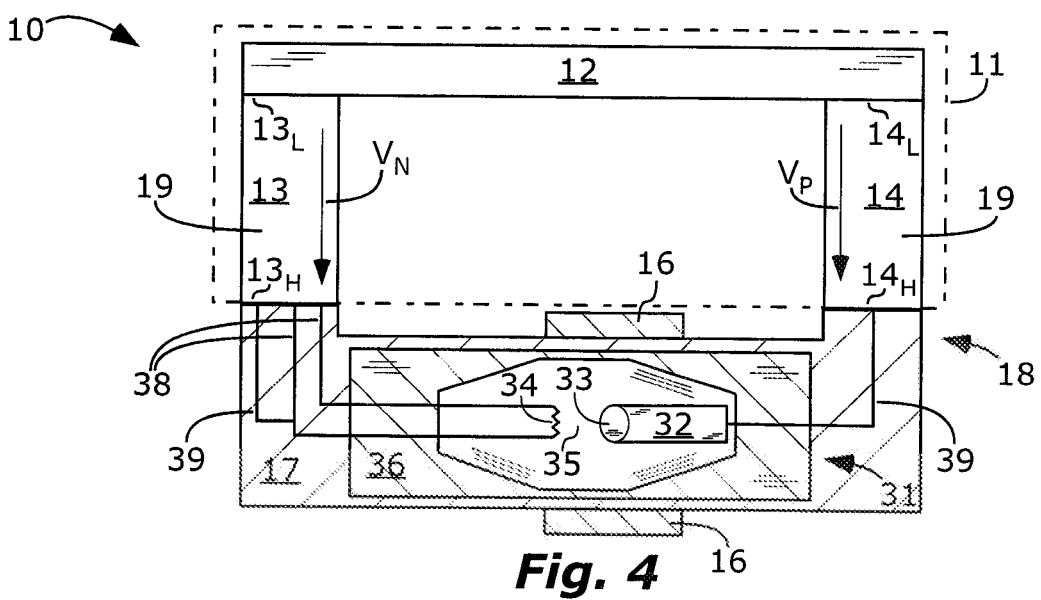

FIG. 4 is a top view of the scanning x-ray source 10 with the raster-wheel 16, the collimator 17, and the x-ray tube 31 in cross-sectional view.

Figure 5:
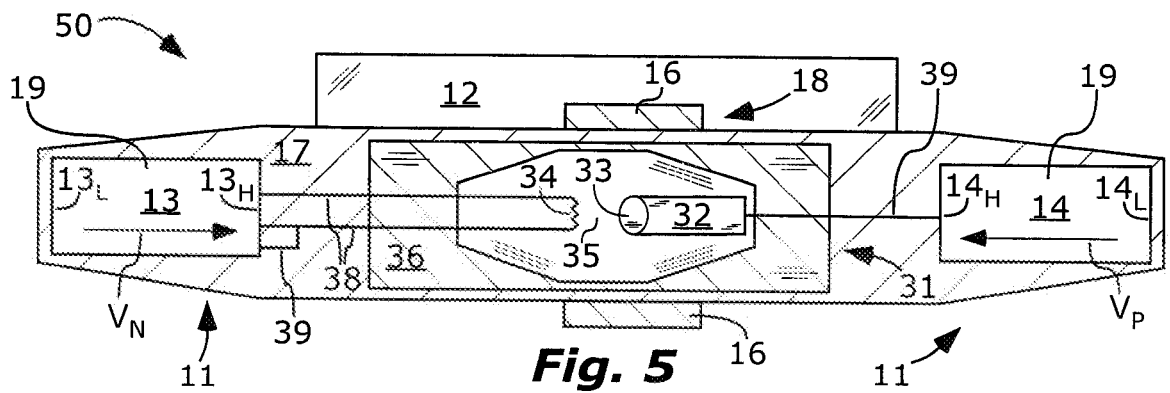

FIG. 5 is a cross-sectional side view of a scanning x-ray source 50, similar to the scanning x-ray source 10, except that the power supply 11 has a different shape, with vectors $V_P$ and $V_N$ extending parallel to and towards each other.

Figure 6:
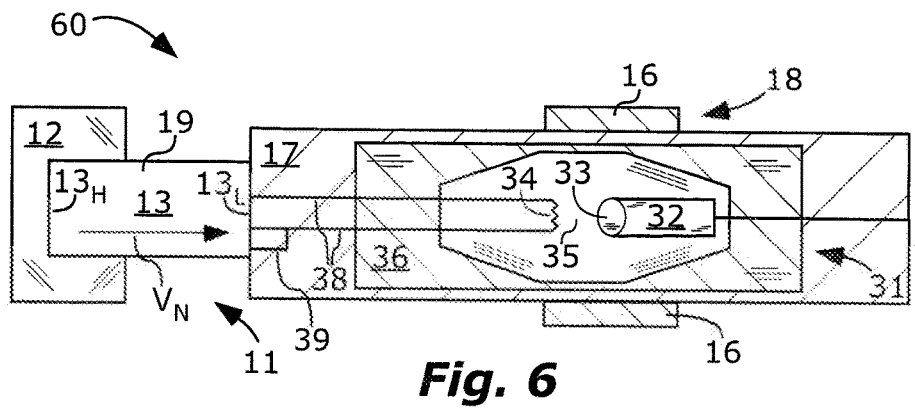

FIG. 6 is a cross-sectional side view of a scanning x-ray source 60, similar to the scanning x-ray sources 10 and 50, except that the power supply 11 of scanning x-ray source 60 is unipolar.

Figure 7:
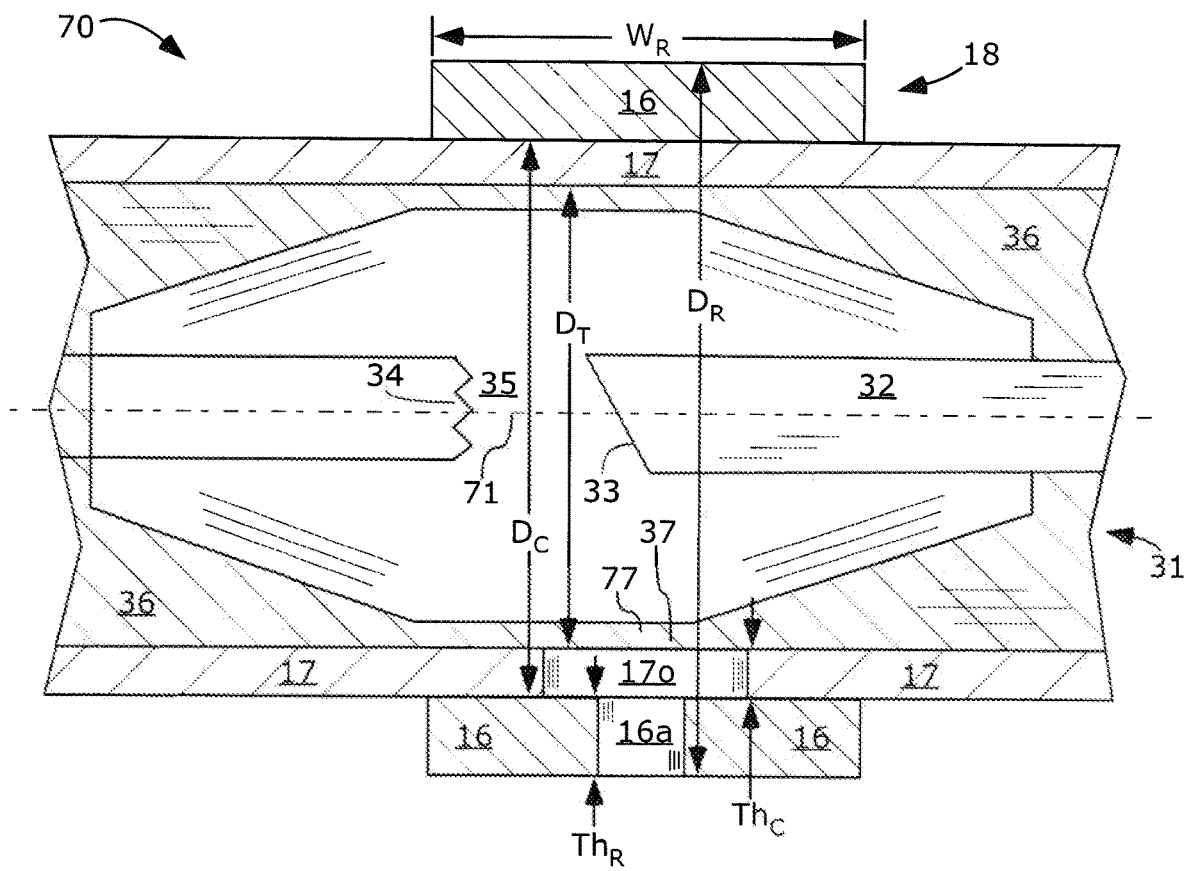

FIG. 7 is a cross-sectional side view of part of a scanning x-ray source 70, expanded to more clearly illustrate the raster-assembly 18 and the x-ray tube 31. The components and dimensions of scanning x-ray source 70 may apply to scanning x-ray sources 10, 50, and 60.

Figure 8:
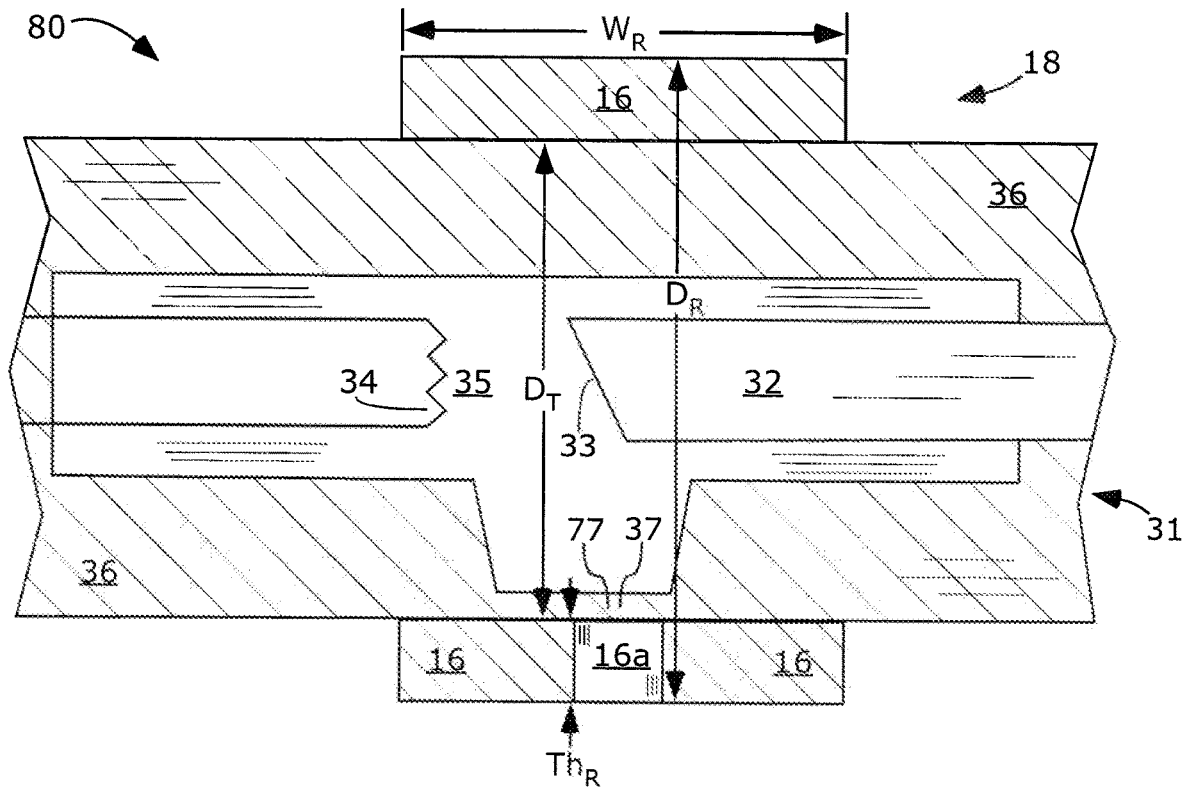

FIG. 8 is a cross-sectional side view of part of a scanning x-ray source 80, expanded to more clearly illustrate the raster-assembly 18 and the x-ray tube 31. Scanning x-ray source 80 does not have a separate collimator. An enclosure 36 of the x-ray tube 31 and an x-ray window 37 function as the collimator 17 and as the opening 17o in the collimator 17, respectively.

Figure 9:
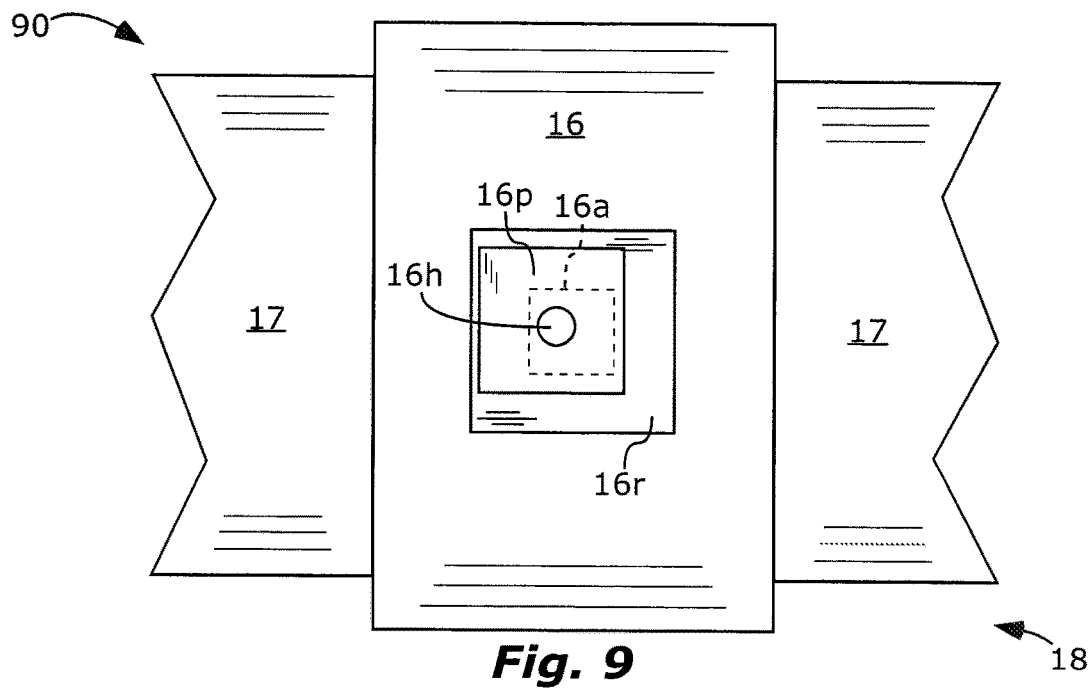

FIG. 9 is a perspective top view of part of a scanning x-ray source 90 with a raster-wheel 16 having an alignment-plate 16p.

Figure 10A:
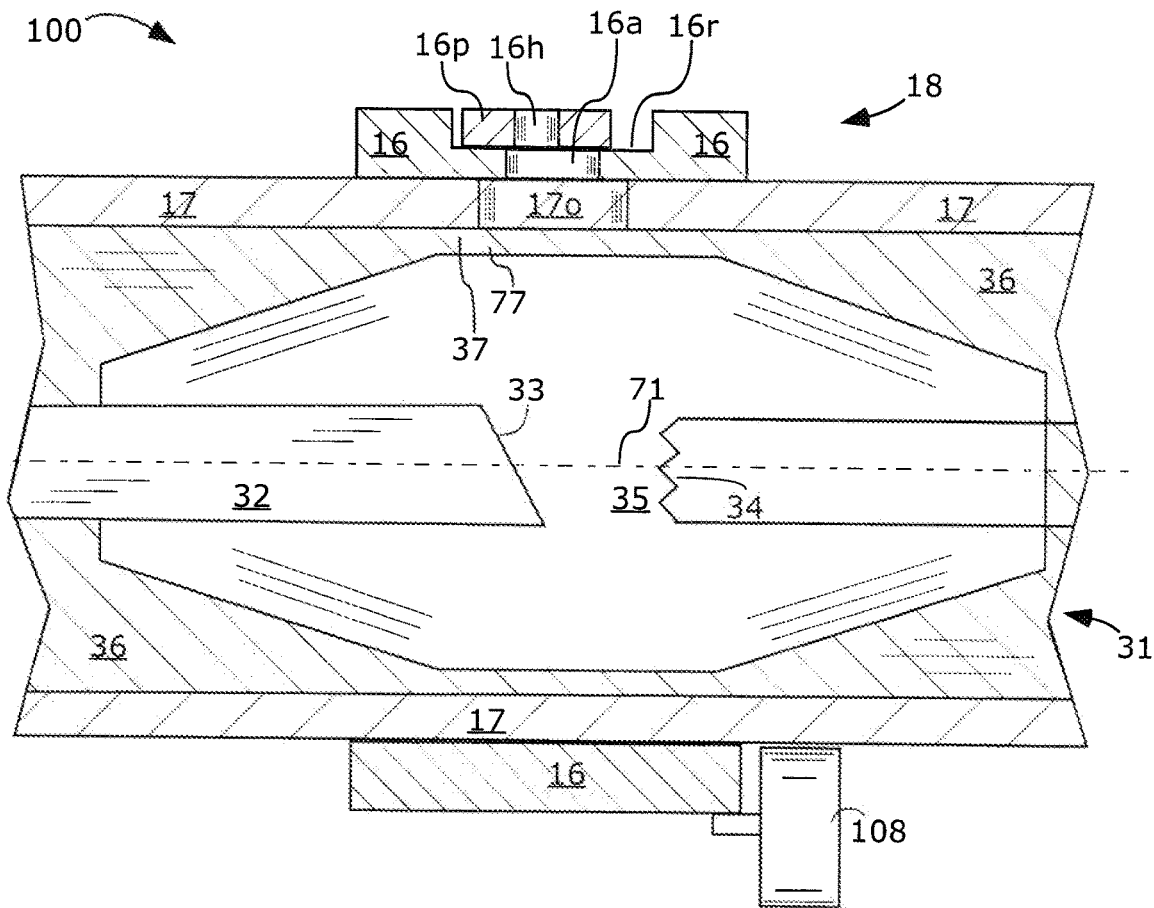

FIG. 10a is a cross-sectional side view of a part of a scanning x-ray source 100, with a raster-wheel 16 including an alignment-plate 16p.

Figure 10B:
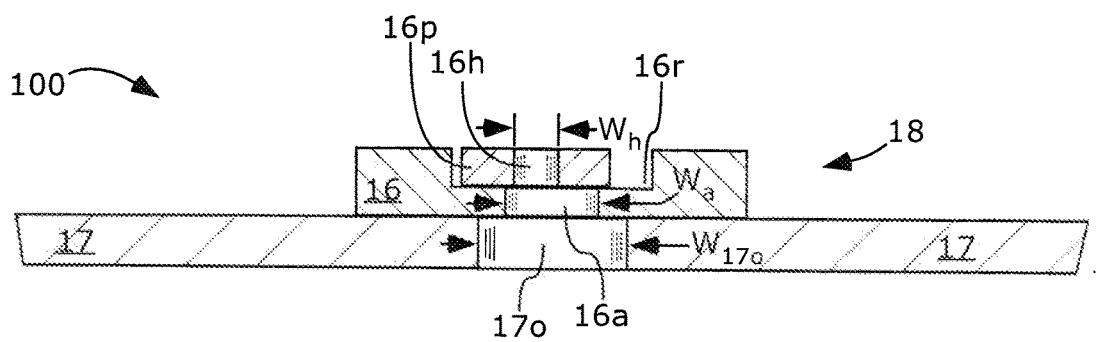

FIG. 10b is a cross-sectional side view of a part of a scanning x-ray source 100, with dimensions of a width $W_{17o}$ of the opening 17o of the collimator 17, a width $W_a$ of the aperture 16a of the raster-wheel 16, and a width $W_h$ of the hole 16h of the alignment-plate 16p.

Figure 11:
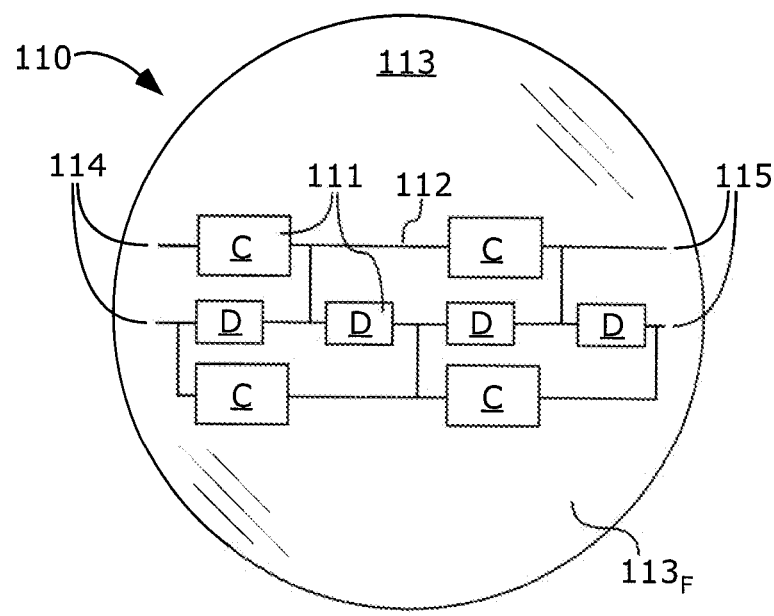

FIG. 11 is a top-view of a voltage-multiplier-stage 110 with electronic-components 111 on a planar-face $113_F$ of a circuit-board 113.

Figure 12:
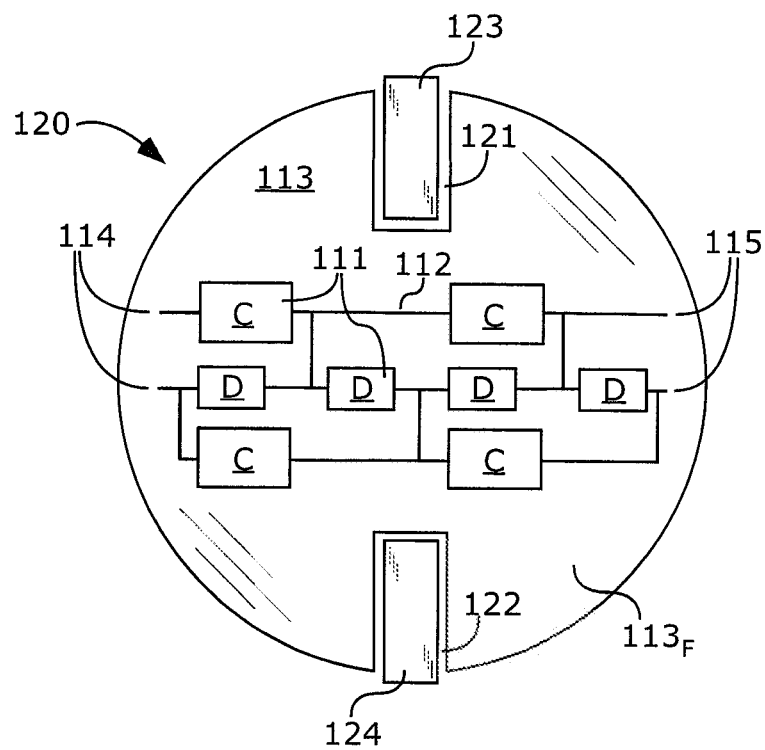

FIG. 12 is a top-view of a voltage-multiplier-stage 120 with electronic-components 111 on a planar-face $113_F$ of a circuit-board 113, a voltage-sensing-resistor 123 in a resistor-slot 121, and a transformer 124 in a transformer-slot 122.

Figure 13:
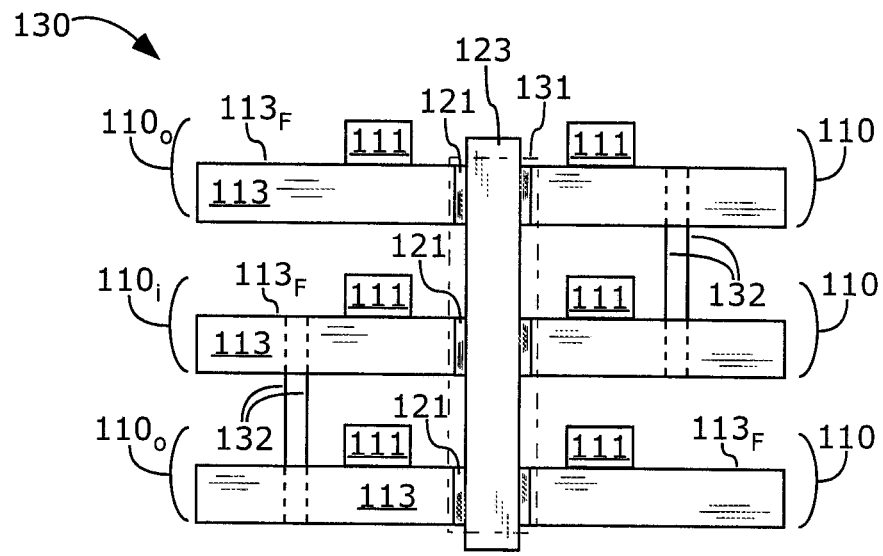

FIG. 13 is a side-view of a compact voltage-multiplier 130 with a stack of voltage-multiplier-stages 110. Each stage 110 can include electronic-components 111 on a planar-face $113_F$ of a circuit-board 113. A voltage-sensing-resistor 123 can be located in a channel 131 formed by aligned resistor-slots 121.

Figure 14:
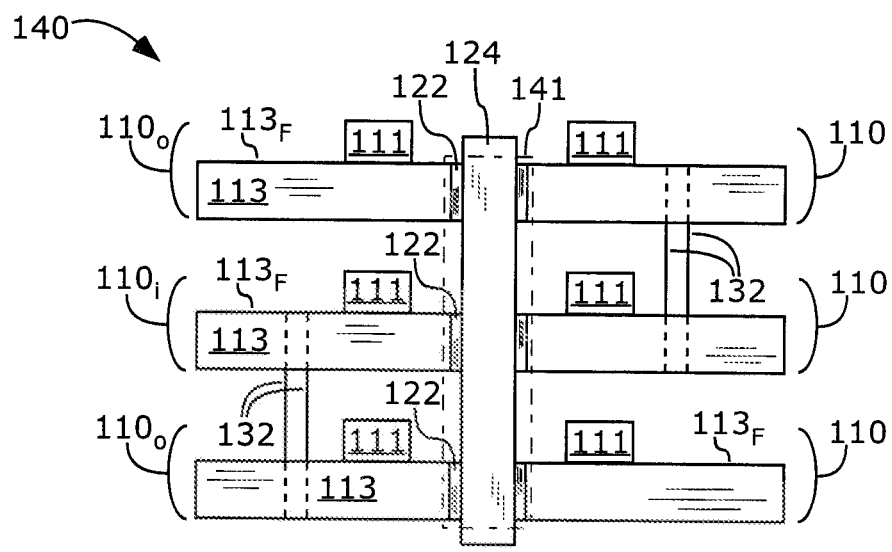

FIG. 14 is a side-view of a compact voltage-multiplier 140 with a stack of voltage-multiplier-stages 110. Each stage 110 can include electronic-components 111 on a planar-face face $113_F$ of a circuit-board 113. A transformer 124 can be located in a channel 141 formed by aligned transformer-slots 122.

Figure 15:
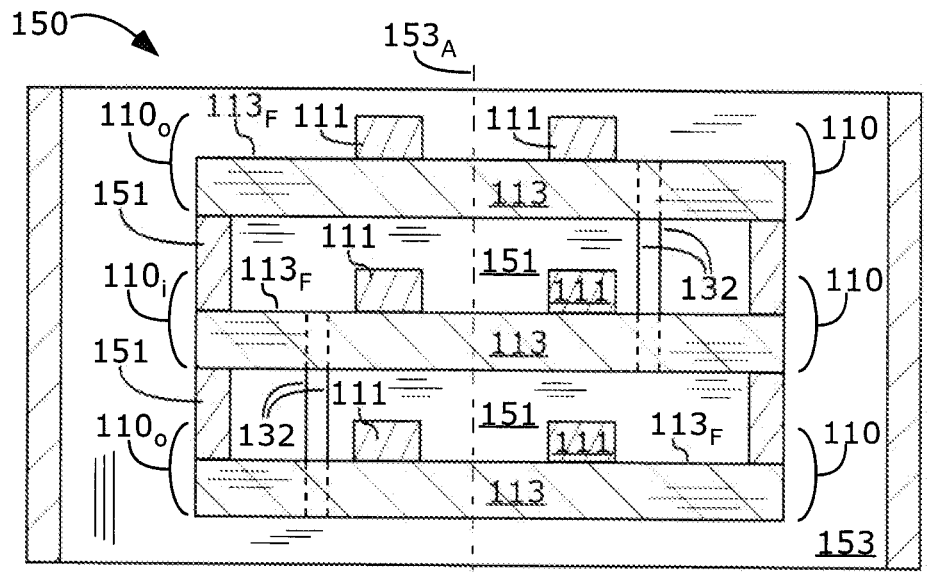

FIG. 15 is a cross-sectional side-view of a compact voltage-multiplier 150 with a stack of voltage-multiplier-stages 110, similar to compact voltage-multipliers 130 and 140. But, the stack of voltage-multiplier-stages 110, of compact voltage-multiplier 150, are in a container 153. Also, each circuit-board 113 is separate from any adjacent circuit-board 113 by an electrically-insulative spacer 151.

Figure 16:
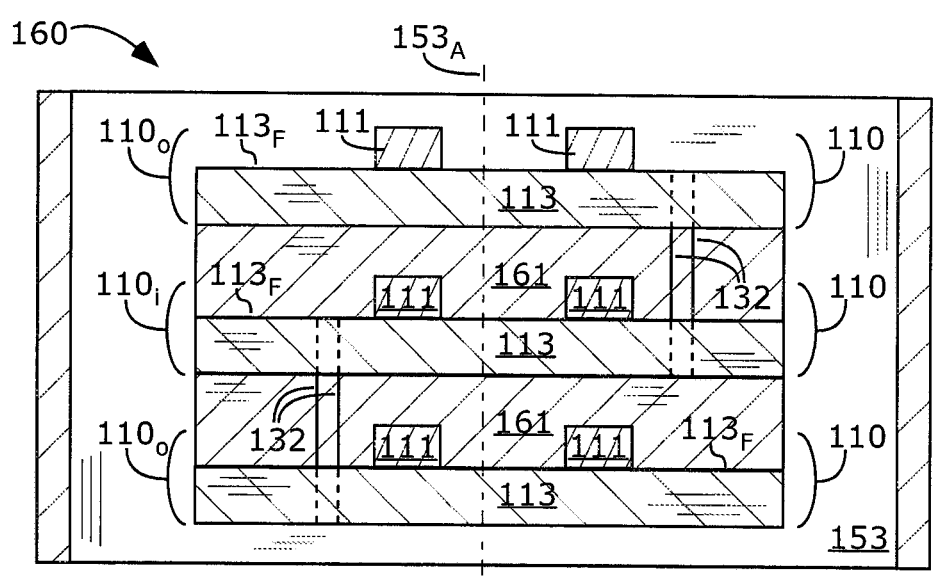

FIG. 16 is a cross-sectional side-view of a compact voltage-multiplier 160 with a stack of voltage-multiplier-stages 110, similar to compact voltage-multipliers 130 and 140. But, the stack of voltage-multiplier-stages 110, of compact voltage-multiplier 160, are in a container 153. Also, each circuit-board 113 is separate from any adjacent circuit-board 113 by wires 132 connecting adjacent circuit-boards 113, by potting 161, or both.

Figure 17:
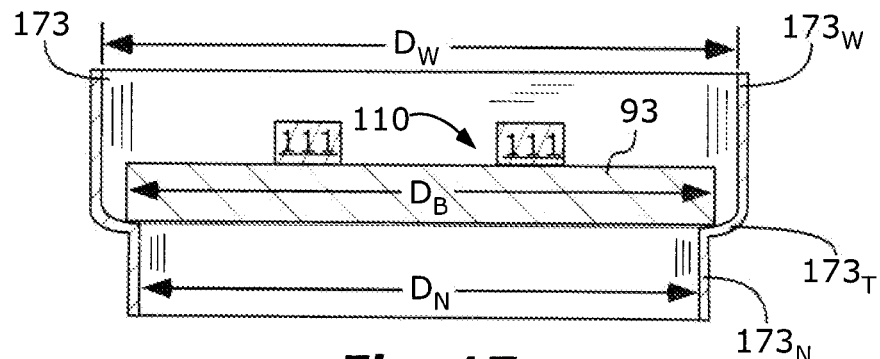
Figure 18:
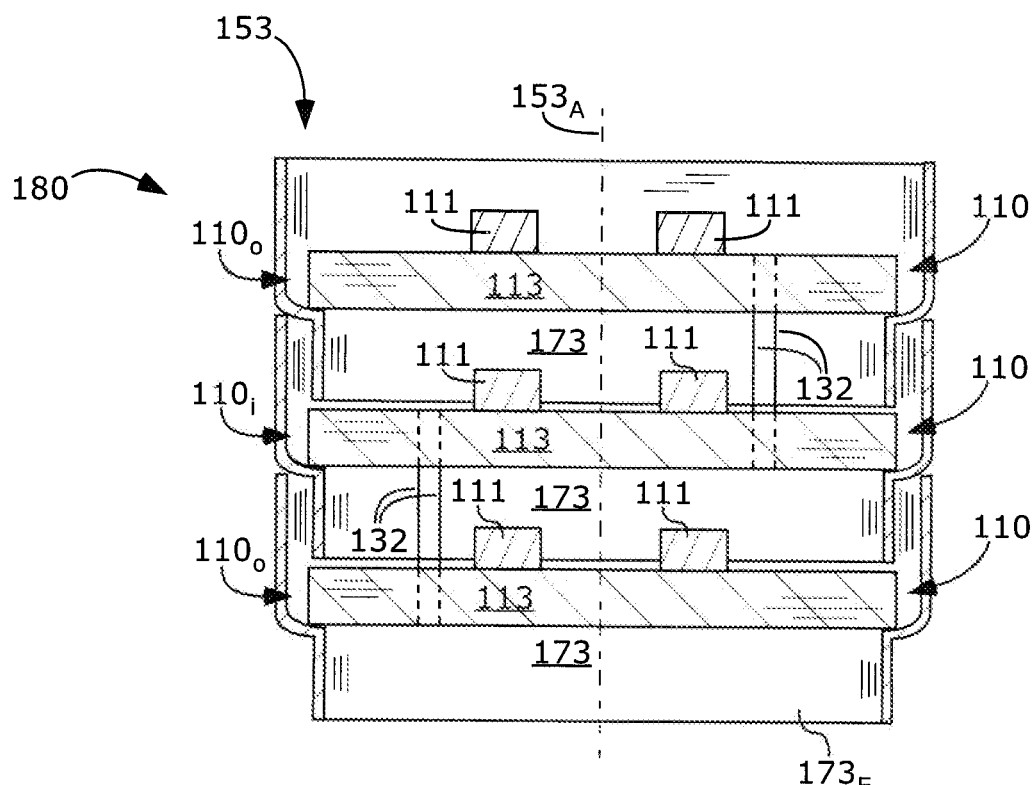

FIG. 17 is a cross-sectional side-view of a voltage-multiplier-stage 110 in a section 173 for a container 153 (see FIG. 18). The section 173 can have (A) a wide-region $173_W$ with an inner-diameter $D_W$ larger than a maximum outer-diameter $D_B$ of the circuit-board 113; and (B) a narrow-region $173_N$ with an inner-diameter $D_N$ smaller than the maximum outer-diameter $D_B$ of the circuit-board 113.

FIG. 18 is a cross-sectional side-view of a compact voltage-multiplier 180 with a stack of voltage-multiplier-stages 110 in a container 153. Each voltage-multiplier-stage 110 is in a section 173 of the container 153. The circuit-board 113 for each section 173 can rest against a narrowing transition-region between the wide-region $173_W$ and the narrow-region $173_N$. The narrow-region $173_N$ of each section 173, except for an end-section $173_E$, can be inserted into the wide-region $173_W$ of an adjacent section 173.

DEFINITIONS

The following definitions, including plurals of the same, apply throughout this patent application. As used herein:

The term "adjoin" means direct and immediate contact. The term "adjacent" includes adjoin, but also includes near or next to with other solid material(s) between the adjacent items.

The term "high voltage", and related terms, refer to the DC absolute value of the voltage. For example, negative 1 kV and positive 1 kV would both be considered as "high voltage" relative to positive or negative 1 V. As another example, negative 40 kV would be considered as "higher voltage" than 0 V.

The term "low voltage", and related terms, refer to the DC absolute value of the voltage. For example, negative 1 V and positive 1 V would both be considered as "low voltage" relative to positive or negative 1 kV. As another example, positive 1 V would be considered as "lower voltage" than 40 kV.

The term "cm" means centimeter, the term "mm" means millimeter, the term "V" means volt(s), and the term "kV" means kilovolt(s).

The term "parallel" means exactly parallel, or substantially parallel, such that planes or vectors associated with the devices in parallel would intersect with an angle of ≤20°. Intersection of such planes or vectors can be ≤1°, ≤5°, or ≤10° if explicitly so stated in the claim.

The term "perpendicular" means exactly perpendicular, perpendicular within normal manufacturing tolerances, or nearly perpendicular, such that any deviation from exactly perpendicular would have negligible effect for ordinary use of the device.

The term "same direction" means exactly the same, or substantially the same, such as within 10° of exactly the same direction.

The term "opposite directions" means exactly opposite, or substantially opposite, such as within 10° of exactly opposite.

The term "rectangle-shape" means four straight sides and four right angles, but the straight sides and the right angles can be approximate, within ordinary manufacturing tolerances.

The term "x-ray tube" is not limited to tubular/cylindrical shaped devices. The term "tube" is used because this is the standard term used for x-ray emitting devices.

Unless explicitly noted otherwise herein, all temperature-dependent values are such values at 25° C.

DETAILED DESCRIPTION

Raster scanning x-ray sources can be used for backscatter imaging and for determining material thickness. These x-ray sources can be heavy and large, and thus difficult to transport and use. Raster scanning x-ray sources can have low resolution due to x-ray backscatter from equipment used to form the scanning x-ray beam. The invention includes scanning x-ray systems, and methods of making scanning x-ray systems, that satisfy these needs. Each example or method may satisfy one, some, or all of these needs.

As illustrated in FIGS. 1-8, scanning x-ray systems 10, 50, 60, 70, and 80 are shown comprising an x-ray source and a raster-assembly 18. The x-ray source can include a power-supply 11 electrically-coupled to an x-ray tube 31.

The power-supply 11 can include a voltage-multiplier 19 capable of producing a large bias voltage, such as for example bias voltage with absolute value of ≥0.5 kV, ≥1 kV, ≥5 kV, or ≥50 kV. The power-supply 11 can also include a control-circuit 12 electrically coupled to, and providing control circuitry for, the voltage-multiplier 19. The voltage-multipliers illustrated in FIGS. 11-18, and described below, can be used as the voltage-multiplier 19 in scanning x-ray systems 10, 50, 60, 70, and 80.

The x-ray tube 31 can include (A) an anode 32 with a target-material 33 configured for production and emission of x-rays in response to impinging electrons; (B) a cathode 34 capable of emitting electrons towards the target-material 33 on the anode 32; (C) an evacuated-region 35 between the anode 32 and the cathode 34; (D) an x-ray window 37 (FIGS. 2, 3, 7, and 8) configured to allow x-rays to emit out of the x-ray tube 31; and (E) an enclosure 36 encircling at least part of the cathode 34, the anode 32, and the evacuated-region 35. The enclosure 36 can electrically insulate the cathode 34 from the anode 32.

The power-supply 11 can provide the large bias voltage to the x-ray tube 31 through wire 39. The power-supply 11 can provide alternating current to a filament (associated with the cathode 34) through wires 38.

The x-ray tube 31 can be side window or transmission target. Side window (i.e. reflective target) x-ray tubes 31 are shown in the figures, but the inventions herein are also applicable to transmission target x-ray tubes.

The x-ray window 37 can include some or all of the properties (e.g. low deflection, high x-ray transmissivity, low visible and infrared light transmissivity) of the x-ray windows described in U.S. Pat. No. 9,502,206, which is incorporated herein by reference in its entirety. The x-ray window 37 can be located to allow x-rays from the target-material 33 to emit out of the x-ray tube 31. The enclosure 36 can include a thin-region 77 (see FIGS. 7-8) configured as the x-ray window 37. The thin-region 77 can have a thickness and material to allow transmission of x-rays and to withstand differential pressure across the thin-region 77. The enclosure 36, including the thin-region 77, can comprise ceramic. The term x-ray window 37 can be replaced by the thin-region 77 in the following discussion.

The raster-assembly 18 can be attached to the x-ray tube 31. The raster-assembly 18 can encircle the x-ray tube 31. The raster-assembly 18 can include a collimator 17 and a raster-wheel 16. Example materials for the collimator 17, for the raster-wheel 16, or both include tungsten, titanium, copper, iron, nickel, copper, or combinations thereof. For example, the collimator 17, the raster-wheel 16, or both can include ≥25 weight percent, ≥50 weight percent, ≥75 weight percent, or ≥90 weight percent tungsten or other example material.

The collimator 17 can encircle the x-ray window 37, the target-material 33, or both. The collimator 17 can adjoin the x-ray window 37 or can be separated from the x-ray window 37 by a small distance, such as for example ≤0.1 mm, ≤1 mm, ≤1 cm, or ≤3 cm. The collimator 17 can have an opening 17o aligned with the target-material 33 and with the x-ray window 37 to allow x-rays to transmit out through the opening 17o. The collimator can include a material composition (e.g. W, Ti, or both) and a thickness (varies depending on x-ray energy) capable of blocking x-ray's except through the opening 17o. The collimator 17 can be a separate material and structure from x-ray window 37. The x-ray tube 31 can be enclosed within the collimator 17. The collimator 17 can include two parts joined together at a junction $17_j$ (FIG. 2). The junction $17_j$ can encircle the target-material 33, the x-ray window 37, or both.

The raster-wheel 16 can encircle the x-ray window 37 and the collimator 17. The raster-wheel 16 can be cylindrical and annular. The raster-wheel 16 can adjoin the collimator 17 or can be separated from the collimator 17 by a small distance, such as for example ≤0.1 mm, ≤1 mm, ≤1 cm, or ≤3 cm.

The raster-wheel 16 can be capable of rotating around the x-ray window 37 and the collimator 17. For example, ball bearings, lubricant, or both can allow the raster-wheel 16 rotate freely. A mechanism, such as for example a stepper motor 108 (FIG. 10a), a belt and an AC synchronous, asynchronous, or induction motor, or a belt and a DC series, shunt, or compound wound motor, can cause rotation of the raster-wheel 16.

The raster-wheel 16 can be capable of rotating around an axis 71 (FIG. 7) of the x-ray tube 31. The axis 71 of the x-ray tube 31 can extend through the cathode 34 and the anode 32. The axis 71 of the x-ray tube 31 can be aligned with an electron beam emitted from the cathode 34 to the target-material 33 on the anode 32.

The raster-wheel 16 can include an aperture $16_a$, capable of repeatedly aligning with the opening 17o of the collimator 17 and the x-ray window 37 of the x-ray tube 31 as the raster-wheel 16 rotates around the collimator 17, and allowing x-rays to pass out of the opening 17o of the collimator 17 and the x-ray window 37 of the x-ray tube 31 of the scanning x-ray system 10, 50, 60, 70 or 80 when so aligned. The raster-wheel 16 can have a material composition (e.g. W, Ti, or both) and a thickness (varies depending on x-ray energy) capable of blocking x-rays except through the aperture $16_a$. The aperture $16_a$ can be circular.

Placement of the raster-assembly 18 directly on the x-ray tube 18, and the raster-wheel 16 directly on the collimator 17, can result in a smaller, lighter scanning x-ray system. Furthermore, this configuration can result in higher resolution at the detector because stray x-rays are reflected back into the x-ray tube—not into the detector.

Following are example relationships of the x-ray tube 31, the collimator 17, and the raster-wheel 16, quantifying the close relationship between these components: $1<D_C/D_T$; $D_C/D_T \leq 1.2$, $D_C/D_T \leq 1.5$, $D_C/D_T \leq 2$, $D_C/D_T \leq 3$, or $D_C/D_T \leq 4$; $1<D_R/D_C$; $D_R/D_C \leq 1.2$, $D_R/D_C \leq 1.5$, $D_R/D_C \leq 2$, $D_R/D_C \leq 3$, or $D_R/D_C \leq 4$; $1<D_R/D_T$; $D_R/D_T \leq 1.3$, $D_R/D_T \leq 1.6$, $D_R/D_T \leq 3$, or $D_R/D_T \leq 4$; $D_C/Th_C \geq 2$, $D_C/Th_C \geq 4$, $D_C/Th_C \geq 8$, or $D_C/Th_C \geq 12$; $D_R/Th_R \geq 2$, $D_R/Th_R \geq 4$, $D_R/Th_R \geq 8$, or $D_R/Th_R \geq 12$. $D_C$ is an outer diameter of the collimator 17 adjacent to the opening 17o. $D_T$ is an outer diameter of the x-ray tube 31 at the x-ray window 37. $D_R$ is an outer diameter of the raster-wheel 16 adjacent to the aperture $16_a$. $Th_C$ is a wall thickness of the collimator 17 adjacent to the opening 17o. $Th_R$ is a wall thickness of the raster-wheel 16 adjacent to the aperture $16_a$.

Due to close proximity of the raster-wheel 16 to the x-ray tube 31, a raster-wheel 16 with small width $W_R$ can block stray x-rays. For example, the width $W_R$ of the raster-wheel 16 can be ≤0.5 cm, ≤2 cm, or ≤6 cm; and can be ≥0.1 mm.

Example dimensions of a scanning x-ray source include: $D_C/D_T=1.2$, $D_R/D_C=1.3$, $D_R/D_T=1.6$, $D_C/Th_C=12$, $D_R/Th_R=8$. $W_R=1.5$ cm, and a distance between the x-ray tube 31 and the raster-wheel 16 is =0.5 cm.

As illustrated in FIGS. 1-5, the voltage-multiplier 19 of the power-supply 11 can be a bipolar x-ray source with a positive-voltage-source 14 and a negative-voltage-source 13.

The positive-voltage-source 14 can have a low-voltage-end $14_L$ and a high-voltage-end $14_H$. The positive-voltage-source 14 can be capable of producing a large bias voltage (e.g. ≥0.5 kV, ≥5 kV, or ≥50 kV) at the high-voltage-end $14_H$. The high-voltage-end $14_H$ of the positive-voltage-source 14 can be electrically-coupled to the anode 32 of the x-ray tube 31.

The negative-voltage-source 13 can have a low-voltage-end $13_L$ and a high-voltage-end $13_H$. The negative-voltage-source 13 can be capable of producing a large bias voltage (≤−0.5 kV, ≤−5 kV, or ≤−50 kV) at the high-voltage-end $13_H$. The high-voltage-end $13_H$ of the negative-voltage-source 13 can be electrically-coupled to the cathode 34 of the x-ray tube 31.

The bipolar power-supply can further comprise (A) a vector from the low-voltage-end $14_L$ to the high-voltage-end $14_H$ of the positive-voltage-source 14, defining a p-vector $V_P$; and (B) a vector from the low-voltage-end $13_L$ to the high-voltage-end $13_H$ of the negative-voltage-source 13, defining an n-vector $V_N$. As illustrated in FIGS. 1-4, the p-vector and the n-vector can both extend in the same direction, parallel to each other, towards the x-ray tube 31. The control-circuit 12 can extend between and can be electrically coupled to: (A) the low-voltage-end $14_L$ of the positive-voltage-source 14, and (B) the low-voltage-end $13_L$ of the negative-voltage-source 13.

As illustrated in FIG. 1 the p-vector $V_P$, the x-ray tube 31, the n-vector $V_N$, and the control-circuit 12 can form a rectangle-shape 15. As illustrated in FIG. 5, the high-voltage-end $14_H$ of the positive-voltage-source 14 and the high-voltage-end $13_H$ of the negative-voltage-source 13 can be proximate to the x-ray tube 31. The p-vector and the n-vector can both extend in opposite directions, parallel to each other, extending towards the x-ray tube 31.

As illustrated in FIG. 5, the collimator 17 can enclose the negative-voltage-source 13, the positive-voltage-source 14, or both. The collimator 17 can taper, becoming narrower towards the low-voltage-end $13_L$ of the negative-voltage-source 13, towards the low-voltage-end $14_L$ of the positive-voltage-source 14, or both. This taper can allow less electrical insulation at the low-voltage-end $13_L/14_L$ and more electrical insulation at the high-voltage-end $13_H/14_H$. The reduced electrical insulation at the low-voltage-end $13_L/14_L$ can result in lower overall weight of the power-supply 11. This taper can also apply to other collimator 17 examples described herein, including those in FIGS. 1-4 and 6.

An expanded raster-assembly 18 is illustrated in FIGS. 7-10b to clearly illustrate components and dimensions of the raster-assembly 18. Other components of the scanning x-ray systems 10, 50, and 60 can be added to the expanded raster-assemblies 18 of FIGS. 7-10b.

As illustrated on scanning x-ray system 80 in FIG. 8, the x-ray tube 31 can act as the collimator 17, thus saving an extra component. The enclosure 36, a hooded anode, or another x-ray tube 31 component, can have a material and thickness for blocking stray x-rays.

The raster-wheel 16 can adjoin or be close to the x-ray tube, such as for example ≤0.5 mm, ≤1 mm, ≤5 mm, or ≤1 cm. The raster-wheel 16 can encircle and can rotate around the x-ray tube 31 at the x-ray window 37. The raster-wheel 16 can include an aperture $16_a$ capable of repeatedly aligning with the x-ray window 37, and allowing x-rays to pass out of the integrated raster scanning x-ray system when so aligned.

It can be difficult to align the aperture $16_a$ of the raster-wheel 16 and the opening 17o of the collimator 17 with x-rays emitted from the target-material 33. For easier manufacturing, an alignment-plate 16p with a hole 16h can be added. The hole 16h can be aligned with the aperture $16_a$ after assembly of the other components. See FIGS. 9-10b. The alignment-plate 16p can be positioned in a recess 16r of the raster-wheel 16 so that the alignment-plate 16p is entirely contained in the recess 16r and does not extend beyond an outer perimeter of the raster-wheel 16 to avoid interfering with rotation of the raster-wheel 16. The alignment-plate 16p can be combined with any other scanning x-ray system described herein, including those shown in any of FIGS. 1-8.

For easier alignment, the opening 17o of the collimator 17 can be larger than the aperture 16a of the raster-wheel 16, and the aperture 16a can be larger than the hole 16h of the alignment-plate 16p. Thus, $W_{17o} > W_a > W_h$, where $W_{17o}$ is a width of the opening of the collimator, $W_a$ is a width of the aperture, and $W_h$ is a width of the hole, all widths measured in a direction parallel with respect to each other.

The alignment-plate 16p can be attached to the raster-wheel by an adhesive (epoxy, braze, solder, etc.), by mechanical-means (set screw), or both. If an adhesive is used, a material composition of the adhesive can be different from a material composition of the alignment-plate 16p and different from a material composition of the raster-wheel 16.

Method

A method of making a scanning x-ray system can comprise some or all of the following steps, which can be performed in the following order or other order if so specified. Some of the steps can be performed simultaneously unless explicitly noted otherwise in the claims. There may be additional steps not described below. These additional steps may be before, between, or after those described. Components of the scanning x-ray system, and the scanning x-ray system itself, can have properties as described above. Any additional description of properties of the scanning x-ray system in the method below, not described above, are applicable to the above described scanning x-ray system.

This method can assist alignment of a hole 16h in an alignment-plate 16p with x-rays. The method can include (a) placing a collimator 17 on an x-ray tube 31, (b) placing a raster-wheel 16 on the collimator 17, (c) placing an alignment-plate 16p on the raster-wheel 16, (d) emitting x-rays from the x-ray tube 31, (e) adjusting alignment of the alignment-plate 16p, and (f) permanently mounting the alignment-plate 16p on the raster-wheel 16.

Voltage-Multiplier Sections

X-ray sources use a voltage-multiplier to generate a large voltage between a cathode and anode of the x-ray tube. The voltage-multiplier can be large and difficult to place in some x-ray source configurations.

Compact voltage-multipliers are illustrated in FIGS. 11-18. The x-ray sources described above, or other high voltage devices, can benefit from a compact voltage-multiplier.

Any of the voltage-multipliers 19 in FIGS. 1-6 can be any example compact voltage-multipliers described below. Any of the compact voltage-multipliers described below can be used with any type of x-ray source, or with any other device requiring high voltage. Thus, the compact voltage-multipliers described below are not limited to use with scanning x-ray systems, or even to use with x-ray sources.

A voltage-multiplier-stage 110, illustrated in FIG. 11, includes electronic-components 111 on a planar-face $113_F$ of a circuit-board 113. The electronic-components 111 can include capacitors C and diodes D, electrically coupled by traces 112 on the circuit-board 113. The electronic-components 111 can be electrically coupled in Cockcroft Walton configuration.

As illustrated in FIG. 11, each voltage-multiplier-stage 110 can consist essentially of two Cockcroft Walton stages, each Cockcroft Walton stage having two capacitors and two diodes.

The voltage-multiplier-stage 110 can include an input-voltage 114 from a lower voltage stage or alternating current input. The voltage-multiplier-stage 110 can multiply or increase the input-voltage 114 to provide an output-voltage 115 with a higher bias voltage than the input-voltage 114.

The voltage-multiplier-stage 120 in FIG. 12 includes openings for additional components, thus saving valuable space. A voltage-sensing-resistor 123 can be located in a resistor-slot 121. A transformer 124 can be located in a transformer-slot 122. For example, the transformer 124 can include toroidal transformer core(s). The transformer 124 can provide alternating current to a filament of the x-ray tube 31 at a high bias voltage.

The voltage-sensing-resistor 123 in the resistor-slot 121 can be combined with the transformer 124 in the transformer-slot 122, as illustrated in FIG. 12. Alternatively, a voltage-multiplier-stage can include only one of these devices 123 or 124 in one of these slots 121 or 122.

A compact voltage-multiplier 130 or 140, including a stack of voltage-multiplier-stages 110, is illustrated in FIGS. 13-14. The planar-face $113_F$ of each circuit-board 113 can be parallel with respect to other circuit-boards 113 in the stack. The stack can include inner-voltage-multiplier-stage(s) $110_i$ between two outer-voltage-multiplier-stages $110_o$.

Each inner-voltage-multiplier-stage $110_i$ can be electrically coupled 132 to two adjacent voltage-multiplier-stages 110.

One outer-voltage-multiplier-stage $110_o$ can receive input voltage from an alternating current input-voltage 114. This input-voltage 114 can be an alternating current source on the control-circuit 12. This outer-voltage-multiplier-stage $110_o$ can provide output-voltage 115 to an inner-voltage-multiplier-stage $110_i$ or to the other outer-voltage-multiplier-stage $110_o$.

The other outer-voltage-multiplier-stage $110_o$ can be electrically coupled 132 to an inner-voltage-multiplier-stage $110_i$ or to the other outer-voltage-multiplier-stage $110_o$. This outer-voltage-multiplier-stage $110_o$ can provide an output-voltage 115 to an x-ray tube 31 or other high voltage device.

A plug and socket can be used to form the electrical coupling 132, and thus attach one voltage-multiplier-stage 110 to an adjacent voltage-multiplier-stage 110. Alternatively, the electrical coupling 132 can be formed by (A) inserting wires into or through a lower a circuit-board 113 of a lower voltage-multiplier-stage 110. (B) soldering, (C) inserting these wires through an upper and adjacent voltage-multiplier-stage 110, (D) and then soldering. These wires can be electrically coupled to traces 112 on the circuit-board 113.

Each circuit-board 113 can be separated from adjacent circuit-board(s) 113, and held rigidly in place, by wires of the electrical coupling 132 (with stiff wires).

As illustrated in FIG. 13, the resistor-slots 121 of the stack of voltage-multiplier-stages 100 can be aligned to form a channel 131. A voltage-sensing-resistor 123 can be located in the channel 131. As illustrated in FIG. 14, the transformer-slots 122 of the stack of voltage-multiplier-stages 110 can be aligned to form a channel 141. A transformer 124 can be located in the channel 141. The transformer 124 can be used for voltage isolation between an alternating current source and a filament of the x-ray tube 31.

Compact voltage-multipliers 150, 160, and 180, illustrated in FIGS. 15-16 and 18, include a stack of voltage-multiplier-stages 110, similar to compact voltage-multiplier 130 or 140, but further comprise a container 153. The stack of voltage-multiplier-stages 110 can be in the container 153. The container 153 can have a cylindrical-shape. The planar-face $113_F$ of each circuit-board 113 can be perpendicular to a longitudinal axis $153_A$ of the cylindrical-shape.

As illustrated in FIG. 15, each circuit-board 113 can be separated from adjacent circuit-board(s) 113 by electrically-insulative spacer(s) 151. Thus, manufacture can include (A) soldering wires for the electrical coupling 132 to a voltage-multiplier-stage 110, (B) inserting the voltage-multiplier-stage 110 into the container 153, (C) inserting an electrically-insulative spacer 151 into the container 153, (D) inserting another voltage-multiplier-stage 110 into the container 153 with wires for the electrical coupling 132 extending through the second voltage-multiplier-stage 110, (E) then repeating some or all of steps A-D.

As illustrated in FIGS. 17-18, the container 153 can include separate sections 173, one section 173 for each voltage-multiplier-stage 110. Each section 173 can have a wide-region $173_W$ with an inner-diameter $D_W$ larger than a maximum outer-diameter $D_B$ of the circuit-board 113, and a narrow-region $173_N$ with an inner-diameter $D_N$ smaller than the maximum outer-diameter $D_B$ of the circuit-board 113. The circuit-board 113 for each section 173 can rest against a narrowing transition-region $173_T$ between the wide-region $173_W$ and the narrow-region $173_N$. The narrow-region $173_N$ of each section 173, except for an end-section $173_E$, can be inserted into the wide-region $173_W$ of an adjacent section 173.

In any of the above compact voltage-multipliers 130, 140, 150, 160, or 180, adjacent voltage-multiplier-stages 110 can be separated from each other by electrical potting material 161 (illustrated in FIG. 16). The stack of voltage-multiplier-stages 110 can be assembled with the electrical potting material 161, then inserted into the container 153. Alternatively, the electrical potting material 131 can be added through holes in the container 151 after inserting stack of voltage-multiplier-stages 110 into the container 153.

The electrical potting material 161 can improve electrical standoff. But an advantage of not using the electrical potting material 161 is that a repair can be easily made to the compact voltage-multiplier 130, 140, 150, 160, or 180 by removing and replacing or repairing the defective voltage-multiplier-stage 110.

What is claimed is:
1. A scanning x-ray system comprising:
a bipolar x-ray source including a power-supply electrically-coupled to an x-ray tube;
the power-supply including a positive-voltage-source and a negative-voltage-source;
the positive-voltage-source: (a) having a low-voltage-end and a high-voltage-end and (b) capable of producing a bias voltage with absolute value of ≥1 kV at the high-voltage-end;
the negative-voltage-source (a) having a low-voltage-end and a high-voltage-end and (b) capable of producing a bias voltage with absolute value of ≥1 kV at the high-voltage-end;
the x-ray tube including (a) an anode with a target-material configured for production, and emission of x-rays in response to impinging electrons: (b) a cathode capable of emitting electrons towards the target-material on the anode; (c) an evacuated-region between the anode and the cathode; (d) an enclosure encircling the cathode, the anode, and the evacuated-region; and (e) an x-ray window configured and located to allow x-rays from the target-material to emit out of the x-ray tube;
the high-voltage-end of the positive-voltage-source electrically-coupled to the anode of the x-ray tube and the high-voltage-end of the negative-voltage-source electrically-coupled to the cathode of the x-ray tube;
the enclosure of the x-ray tube: (a) comprising ceramic: (b) electrically insulating the cathode from the anode; and (c) having a thin-region configured as the x-ray window;
a raster-assembly attached to and encircling the x-ray tube, the raster-assembly including a collimator and a raster-wheel;
the collimator: (a) encircling the x-ray window; (b) separated from the x-ray window by a distance of ≤1 cm; (c) having an opening aligned with the target-material and with the x-ray window to allow x-rays to transmit out through the opening; and (d) including a material composition and thickness capable of blocking x-rays except through the opening;
the raster-wheel: (a) encircling the x-ray window: (b) separated from the collimator by a distance of ≤1 cm; (c) capable of rotating around the enclosure and the collimator; (d) including an aperture capable of repeatedly aligning with the opening of the collimator as the raster-wheel rotates around the collimator, and allowing x-rays to pass out of the integrated raster scanning x-ray system when so aligned; and (e) including a material composition and thickness capable of blocking x-rays except through the aperture;
a vector from the low-voltage-end to the high-voltage-end of the positive-voltage-source, defining a p-vector; and a vector from the low-voltage-end to the high-voltage-end of the negative-voltage-source, defining an n-vector;
the p-vector and the n-vector both extending in the same direction, parallel to each other, towards the x-ray tube; and
a control-circuit extending between and electrically coupled to the low-voltage-end of the positive-voltage-source and the low-voltage-end of the negative-voltage-source; the p-vector, the x-ray tube, the n-vector, and the control-circuit forming a rectangle-shape.

2. The system of claim 1, wherein the raster-wheel further comprises:
an alignment-plate with a hole therethrough; and
the hole aligned with the aperture.

3. The system of claim 2, wherein $W_{17o} > W_a > W_h$, where $W_{17o}$ is a width of the opening of the collimator, $W_a$ is a width of the aperture of the raster-wheel, and $W_h$ is a width of the hole of the alignment-plate, all widths measured parallel to each other.

4. The system of claim 2, wherein the alignment-plate is attached to the raster-wheel by an adhesive, and a material composition of the adhesive is different from a material composition of the alignment-plate and different from a material composition of the raster-wheel.

5. The system of claim 1, wherein the x-ray tube is enclosed within the collimator, the collimator including two parts joined together at a junction encircling the target-material of the anode of the x-ray tube.

6. The system of claim 1, wherein:

$1 < D_C/D_T \leq 2;$ $1 < D_R/D_C \leq 2;$ where $D_C$ is an outer diameter of the collimator adjacent to the opening, $D_T$ is an outer diameter of the x-ray tube at the x-ray window, and $D_R$ is an outer diameter of the raster-wheel adjacent to the aperture.

7. The system of claim 1, wherein:

$4 \leq D_C/Th_C$;

$3 \leq D_R/Th_R$;

$D_C$ is an outer diameter of the collimator adjacent to the opening, $Th_C$ is a wall thickness of the collimator adjacent to the opening, $D_R$ is an outer diameter of the raster-wheel adjacent to the aperture, and $Th_R$ is a wall thickness of the raster-wheel adjacent to the aperture.

8. The system of claim 1, wherein the collimator adjoins the x-ray window on one side of the collimator and the raster-wheel on an opposite side of the collimator.

9. The system of claim 1, further comprising a stepper motor, the stepper motor configured to cause the raster-wheel to rotate around the thin-region of the enclosure and the opening of the collimator.

10. The system of claim 1, wherein a distance between the x-ray tube and the raster-wheel is ≤3 cm.

11. The system of claim 1, wherein $W_R \leq 4$ cm, where $W_R$ is a width of the raster-wheel.

12. The system of claim 1, wherein the collimator and the raster-wheel each comprise tungsten.

13. A scanning x-ray system comprising:
a bipolar x-ray source including a power-sum electrically-coupled to an x-ray tube;
the power-supply including a positive-voltage-source and a negative-voltage-source;
the positive-voltage-source: (a) having a low-voltage-end and a high-voltage-end and (b) capable of producing a bias voltage with absolute value of ≥1 kV at the high-voltage-end;
the negative-voltage-source (a) having a low-voltage-end and a high-voltage-end and (b) capable of producing a bias voltage with absolute value of ≥1 kV at the high-voltage-end;
the x-ray tube including: (a) an anode with a target-material configured for production and emission of x-rays in response to impinging electrons; (b) a cathode capable of emitting electrons towards the target-material on the anode; (c) an evacuated-region between the anode and the cathode; (d) an enclosure encircling the cathode, the anode, and the evacuated-region; and (e) an x-ray window configured and located to allow x-rays from the target-material to emit out of the x-ray tube;
the high-voltage-end of the positive-voltage-source electrically-coupled to the anode of the x-ray tube and the high-voltage-end of the negative-voltage-source electrically-coupled to the cathode of the x-ray tube;
the enclosure of the x-ray tube: (a) comprising ceramic; (b) electrically insulating the cathode from the anode; and (c) having a thin-region configured as the x-ray window;
a raster-assembly attached to and encircling the x-ray tube, the raster-assembly including a collimator and a raster-wheel;
the collimator: (a) encircling the x-ray window; (b) separated from the x-ray window by a distance of ≤1 cm; (c) having an opening aligned with the target-material and with the x-ray window to allow x-rays to transmit out through the opening; and (d) including a material composition and thickness capable of blocking x-rays except through the opening;
the raster-wheel: (a) encircling the x-ray window; (b) separated from the collimator by a distance of ≤1 cm; (c) capable of rotating around a enclosure and the collimator; (d) including an aperture capable of repeatedly aligning with the opening of the collimator as the raster-wheel rotates around the collimator, and allowing x-rays to pass out of the integrated raster scanning x-ray system when so aligned; and (e) including a material composition and thickness capable of blocking x-rays except through the aperture;
a vector from the low-voltage-end to the high-voltage-end of the positive-voltage-source, defining a p-vector; and a vector from the low-voltage-end to the high-voltage-end of the negative-voltage-source; defining an n-vector;
the high-voltage-end of the positive-voltage-source and the high-voltage-end of the negative-voltage-source proximate to the x-ray tube; and
the p-vector and the n-vector both extending in opposite directions, parallel to each other, extending towards the x-ray tube.

14. The system of claim 13, wherein:
the raster-wheel further comprises an alignment-plate with a hole therethrough, and the hole is aligned with the aperture;
$W_{17o} > W_a > W_h$, where $W_{17o}$ is a width of the opening of the collimator, $W_a$ is a width of the aperture of the raster-wheel, and $W_h$ is a width of the hole of the alignment-plate, all widths measured parallel to each other; and
the alignment-plate is attached to the raster-wheel by an adhesive, and a material composition of the adhesive is different from a material composition of the alignment-plate and different from a material composition of the raster-wheel.

15. The system of claim 13, wherein:
$1 < D_C/D_T \leq 2$ and $1 < D_R/D_C \leq 2$ where $D_C$ is an outer diameter of the collimator adjacent to the opening, $D_T$ is an outer diameter of the x-ray tube at the x-ray window, and $D_R$ is an outer diameter of the raster-wheel adjacent to the aperture; and
$4 \leq D_C/Th_C$ and $3 \leq D_R/Th_R$, where $D_C$ is an outer diameter of the collimator adjacent to the opening, $Th_C$ is a wall thickness of the collimator adjacent to the opening, $D_R$ is an outer diameter of the raster-wheel adjacent to the aperture, and $Th_R$ is a wall thickness of the raster-wheel adjacent to the aperture.

16. A scanning x-ray system comprising:
a bipolar x-ray source including a power-supply electrically-coupled to an x-ray tube;
the power-supply including a positive-voltage-source and a negative-voltage-source;
the positive-voltage-source: (a) having a low-voltage-end and a high-voltage-end and (b) capable of producing a bias voltage with absolute value of ≥1 kV at the high-voltage-end;
the negative-voltage-source (a) having a low-voltage-end and a high-voltage-end and (b) capable of producing a bias voltage with absolute value of ≥1 kV at the high-voltage-end;
the x-ray tube including: (a) an anode with a target-material configured for production and emission of x-rays in response to impinging electrons; (b) a cathode capable of emitting electrons towards the target-material on the anode; (c) an evacuated-region between the anode and the cathode; (d) an enclosure encircling the cathode, the anode, and the evacuated-region; and (e) an x-ray window configured and located to allow x-rays from the target-material to emit out of the x-ray tube;
the high-voltage-end of the positive-voltage-source electrically-coupled to the anode of the x-ray tube and the high-voltage-end of the negative-voltage-source electrically-coupled to the cathode of the x-ray tube;

the enclosure of the x-ray tube: (a) comprising ceramic; (b) electrically insulating the cathode from the anode; and (c) having a thin-region configured as the x-ray window;

a raster-assembly attached to and encircling the x-ray tube, the raster-assembly including a collimator and a raster-wheel;

the collimator: (a) encircling the x-ray window; (b) separated from the x-ray window by a distance of ≤1 cm; (c) having an opening aligned with the target-material and with the x-ray window to allow x-rays to transmit out through the opening; and (d) including a material composition and thickness capable of blocking x-rays except through the opening;

the raster-wheel: (a) encircling the x-ray window; (b) separated from the collimator by a distance of ≤1 cm; (c) capable of rotating around the enclosure and the collimator; (d) including an aperture capable of repeatedly aligning with the opening of the collimator as the raster-wheel rotates around the collimator, and allowing x-rays to pass out of the integrated raster scanning x-ray system when so aligned; and (e) including a material composition and thickness capable of blocking x-rays except through the aperture; and the positive-voltage-source and the negative-voltage-source each comprise:
 (a) a stack of voltage-multiplier-stages, each voltage-multiplier-stage including electronic-components on a planar-face of a circuit-board, the planar-face of each circuit-board being parallel with respect to other circuit-boards in the stack;
 (b) the electronic-components on each voltage-multiplier-stage configured to multiply an input-voltage to provide an output-voltage with a higher voltage than the input-voltage; and
 (c) each voltage-multiplier-stage in the stack is electrically coupled to two adjacent voltage-multiplier-stages, except that two outermost voltage-multiplier-stages of the stack are electrically coupled to only one adjacent voltage-multiplier-stage of the stack.

17. The system of claim 16, wherein $1<D_C/D_T\leq 2$ and $1<D_R/D_C\leq 2$, where $D_C$ is an outer diameter of the collimator adjacent to the opening, $D_T$ is an outer diameter of the x-ray tube at the x-ray window; and $D_R$ is an outer diameter of the raster-wheel adjacent to the aperture.

18. A scanning x-ray system comprising:
an x-ray tube configured to emit x-rays out of an x-ray window;
a raster-assembly attached to and encircling the x-ray tube, the raster-assembly including a collimator and a raster-wheel;
the collimator encircling the x-ray tube at the x-ray window and having an opening aligned with the x-ray window to allow x-rays to transmit out through the opening;
the raster-wheel encircling and capable of rotating around the x-ray tube at the x-ray window and the collimator at the opening;
the raster-wheel including an aperture capable of repeatedly aligning with the opening of the collimator as the raster-wheel rotates around the collimator, and allowing x-rays to pass out of the scanning x-ray system when so aligned;
$1<D_C/D_T\leq 3$ and $3\leq D_R/Th_R$ where $D_C$ is an outer diameter of the collimator adjacent to the opening, $D_T$ is an outer diameter of the x-ray tube at the x-ray window, $D_R$ is an outer diameter of the raster-wheel adjacent to the aperture, and $Th_R$ is a wall thickness of the raster-wheel adjacent to the aperture; and
a power-supply configured to provide electrical power to the x-ray tube, the power-supply including a voltage-multiplier, the voltage-multiplier including:
 (a) stack of voltage-multiplier-stages, each voltage-multiplier-stage including electronic-components on a planar-face of a circuit-board, the planar-face of each circuit-board being parallel with respect to other circuit-boards in the stack;
 (b) the electronic-components on each voltage-multiplier-stage configured to multiply an input-voltage to provide an output-voltage with a higher voltage than the input-voltage;
 (c) each voltage-multiplier-stage in the stack is electrically coupled to two adjacent voltage-multiplier-stages; except that two outermost voltage-multiplier-stages of the stack are electrically coupled to only one adjacent voltage-multiplier-stage of the stack;
 (d) one of the two outermost voltage-multiplier-stages is electrically-coupled to a control-circuit capable of providing alternating current to the one of the two outermost voltage-multiplier-stages; and
 (d) another of the two outermost voltage-multiplier-stages electrically-coupled to the anode or to the cathode.

19. The system of claim 18, wherein:
the collimator and the raster-wheel each comprise tungsten; and
the x-ray tube including an enclosure encircling a cathode and an anode, part of enclosure being the x-ray window, and the enclosure being ceramic.

20. The system of claim 18, wherein $W_R\leq 8$ cm, where $W_R$ is a width of the raster-wheel.

* * * * *